Figure 1:
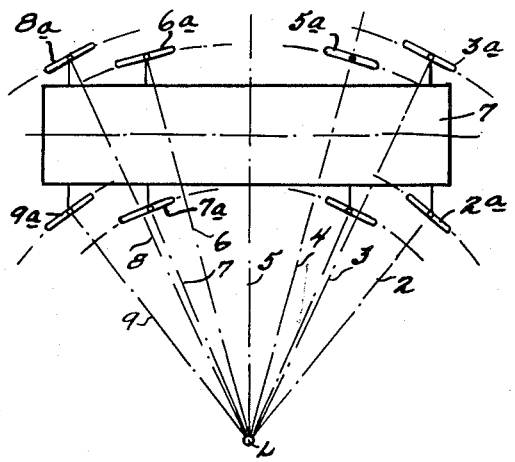

July 24, 1956　　　J. W. LUDOWICI　　　2,756,066
STEERABLE WHEELS IN WHICH THE AXLE AXES INTERSECT AT A
COMMON POINT IN ALL STEERED POSITIONS OF THE WHEELS
Filed July 18, 1951　　　　　　　　　　　　5 Sheets-Sheet 1

INVENTOR.
JOHANN WILHELM LUDOWICI
BY
*Young, Emery & Thompson*
ATTORNEYS

July 24, 1956   J. W. LUDOWICI   2,756,066
STEERABLE WHEELS IN WHICH THE AXLE AXES INTERSECT AT A
COMMON POINT IN ALL STEERED POSITIONS OF THE WHEELS
Filed July 18, 1951   5 Sheets-Sheet 2

INVENTOR.
JOHANN WILHELM LUDOWICI
BY
Young, Emery + Thompson
ATTORNEYS

July 24, 1956 J. W. LUDOWICI 2,756,066
STEERABLE WHEELS IN WHICH THE AXLE AXES INTERSECT AT A
COMMON POINT IN ALL STEERED POSITIONS OF THE WHEELS
Filed July 18, 1951 5 Sheets-Sheet 3

INVENTOR
JOHANN WILHELM LUDOWICI

BY
*Young, Emery & Thompson*
ATTORNEYS

INVENTOR.
JOHANN WILHELM LUDOWICI

INVENTOR.
JOHANN WILHELM LUDOWICI

United States Patent Office 2,756,066
Patented July 24, 1956

2,756,066

STEERABLE WHEELS IN WHICH THE AXLE AXES INTERSECT AT A COMMON POINT IN ALL STEERED POSITIONS OF THE WHEELS

Johann Wilhelm Ludowici, Jockgrim, Pfalz, Germany

Application July 18, 1951, Serial No. 237,384
In Germany October 1, 1948

Public Law 619, August 23, 1954
Patent expires October 1, 1968

2 Claims. (Cl. 280—91)

This invention relates to vehicles having wheels or wheel sets which are suspended on king pins, pivoted bogies, or pivot pins, and all of which are steerable.

Vehicles are known which have in some cases a considerable number of axles, wheels, or wheel sets, and in which all the wheels are steerable. In addition, it is known that exclusively rolling friction takes place between wheels and the road surface only when the axes of all the wheels intersect at the steering centre in question. There are a number of solutions for the steering of all the wheels of vehicles, by means of which this requirement is fulfilled with a certain approximation. Thus, for example, steering rod arrangements are used in order to impart to the individual wheels of a vehicle angles of wheel lock such that the extensions of the wheel axes intersect in this way at one point. As long as the angles of lock are not great, the variations of the actual angle from the ideal angles is no longer important, and in general the difference between actual angles and the ideal angles for angles of lock up to about 20° can be ignored; when such angles of lock are exceeded, however, the differences between the actual and the ideal angles increase to an exceedingly great extent. The so-called "Causant Plan" was developed, which shows graphically the differences mentioned.

The present invention has for an object the provision of a system of steering all wheels of a vehicle in such manner that over any desired steering range the wheels are steerable and their axles always so controlled that their extensions always intersect at a common steering centre. For this purpose, according to the invention there is provided a central steering drive permitting such steering, and also steering installations which permit, with any desired degree of accuracy, the obtaining of the intersection of all the wheel axes at the particular steering centre. Finally, the invention relates to a number of modifications, entailed by the new type of steering, to the vehicle structure hitherto customary.

Figure 2:
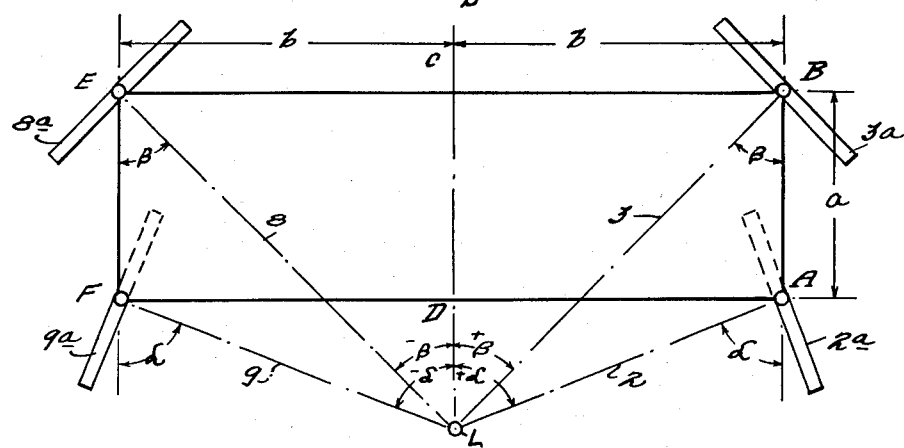
Figure 3:
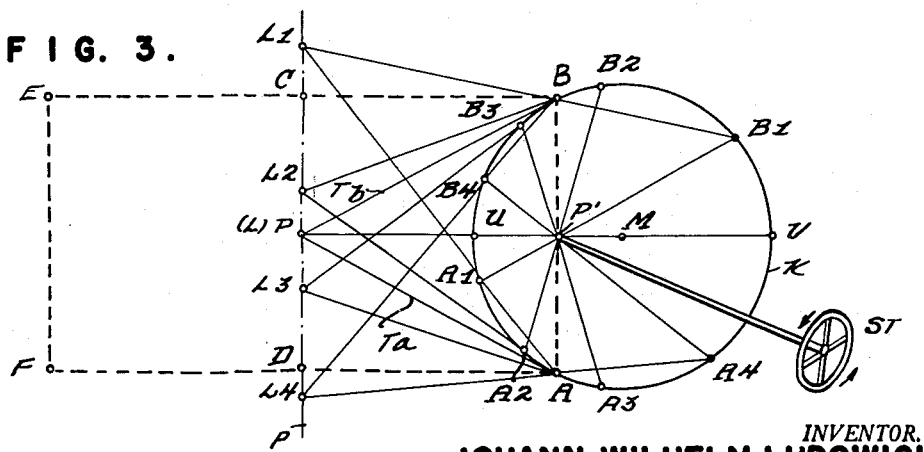
Figure 4:
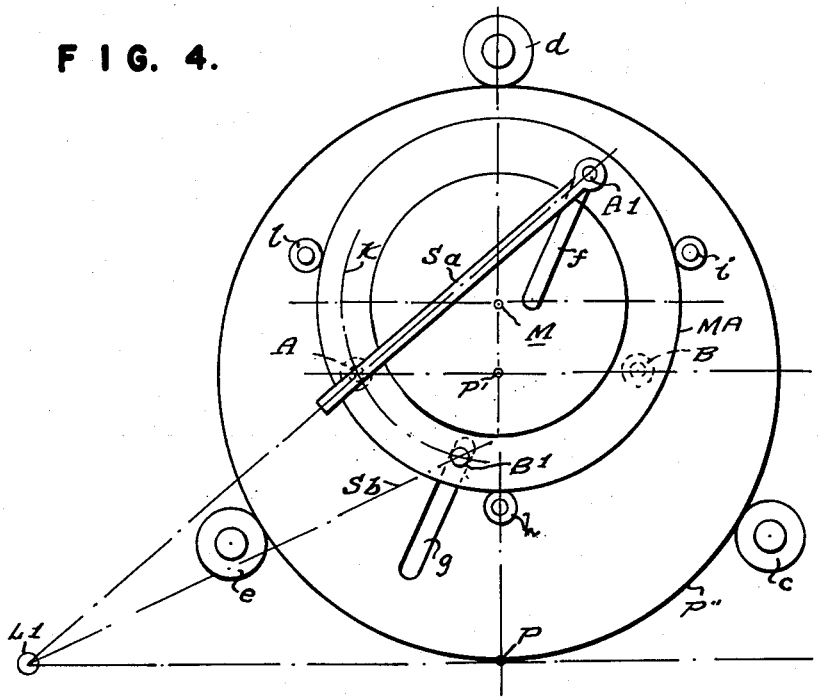
Figure 5:
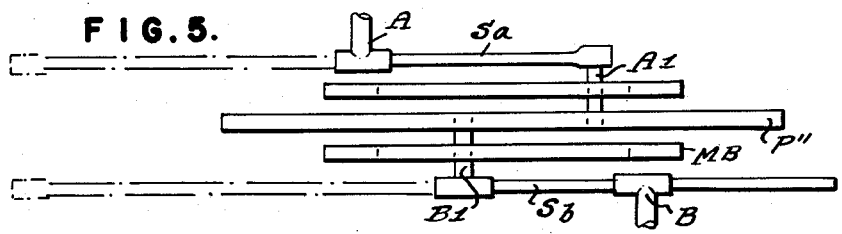
Figure 6:
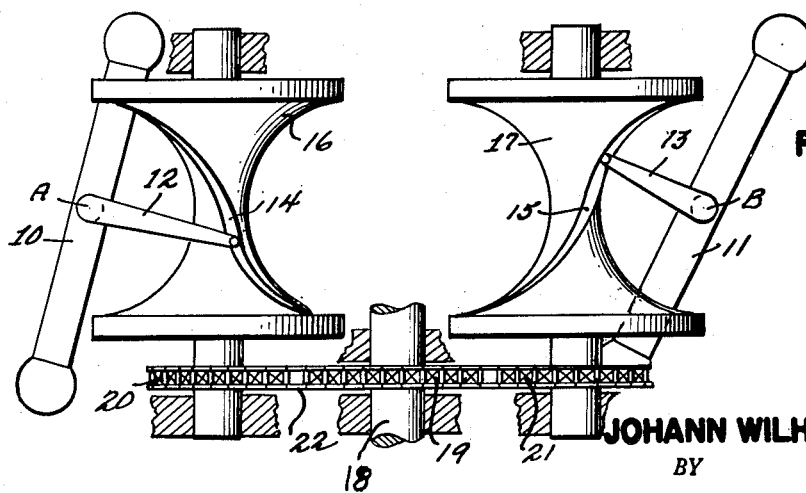
Figure 7:
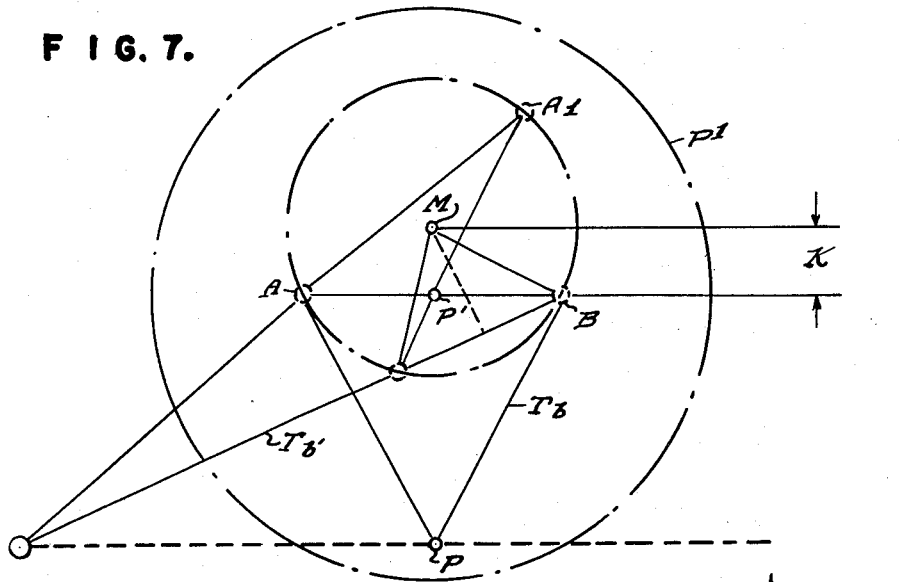
Figure 8:
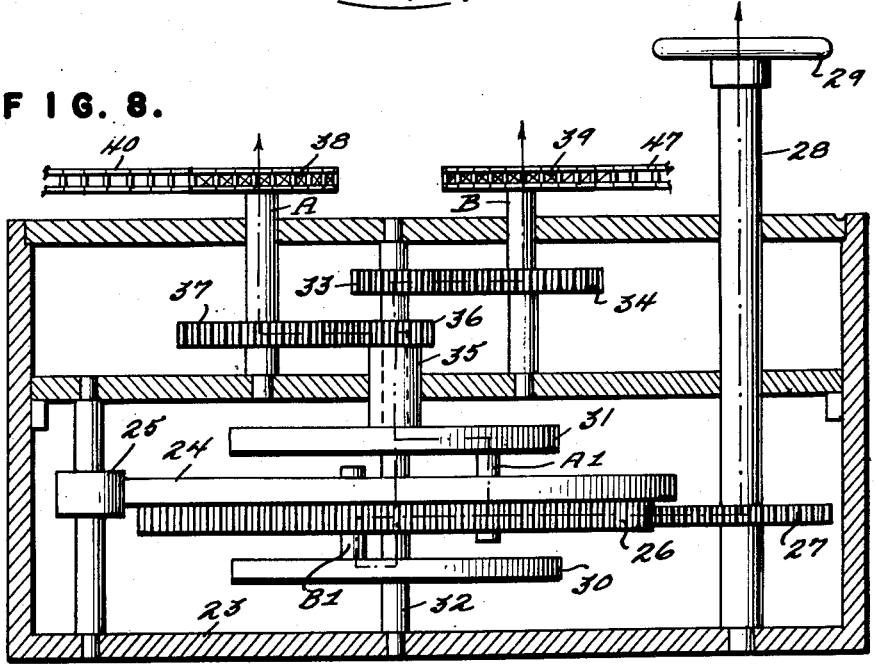
Figure 9:
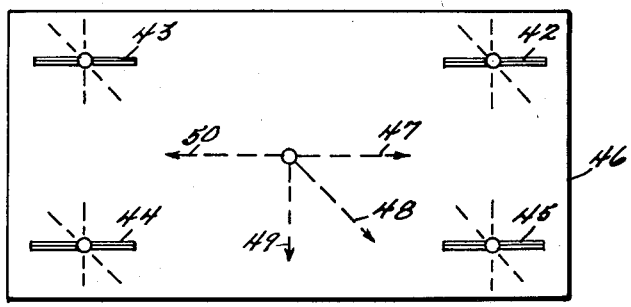
Figure 10:
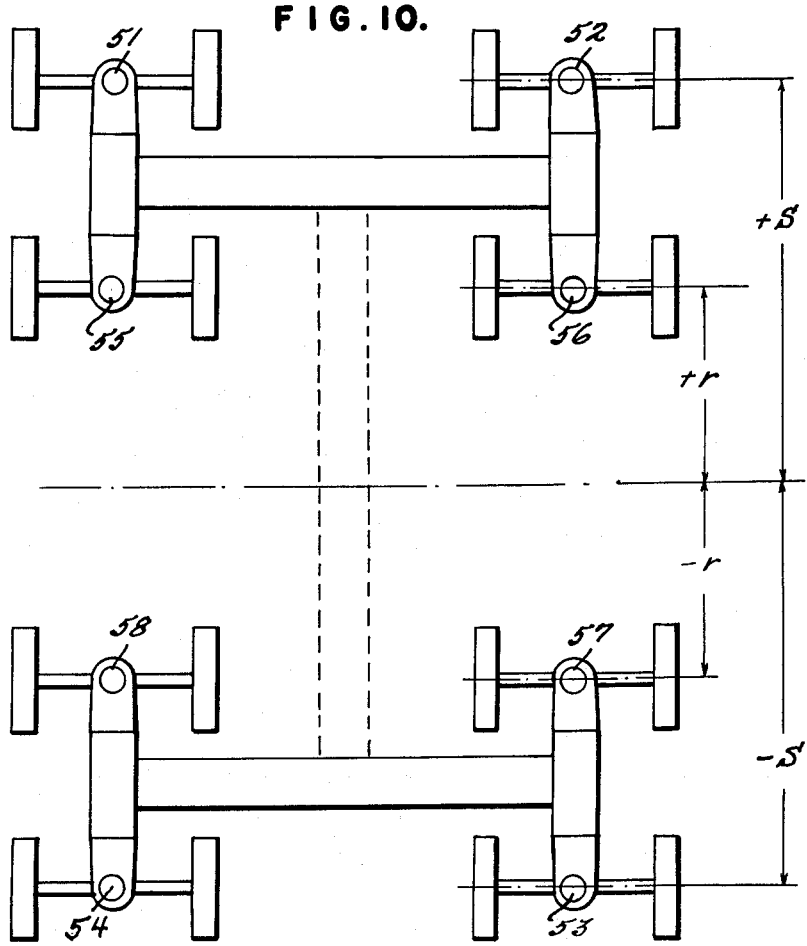
Figure 11:
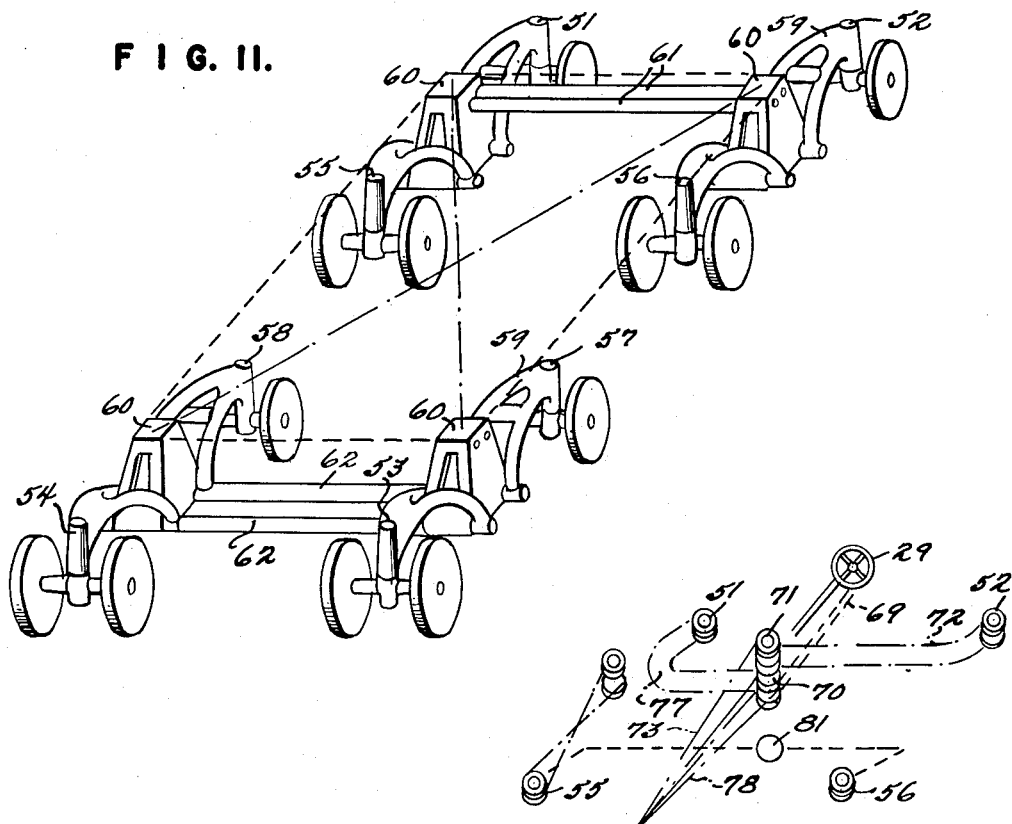
Figure 13:
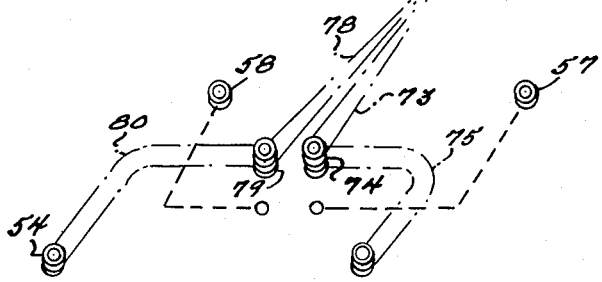
Figure 12:
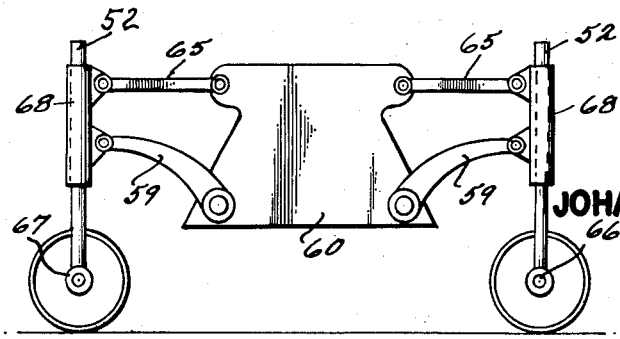

Referring now to the drawings:

Figures 1 to 3 are diagrams illustrating the mathematical principles involved in this invention, Fig. 4 is a top view showing the steering axles, Fig. 5 is a side elevation of the steering mechanism, Fig. 6 is a plan view of the control rollers, Fig. 7 is a diagram with reference to the structure of Fig. 8, Fig. 8 is a sectional view showing a reduction gear, Fig. 9 is a diagrammatic view showing all the wheels on a vehicle, Fig. 10 is a diagrammatic view showing a modified steering arrangement, Fig. 11 is a perspective view of a modified set of steering wheels, Fig. 12 is a side view showing one steering wheel set, and Fig. 13 is a perspective diagrammatic view showing cylinder connecting driving member.

If, for example, a vehicle 1 having eight wheels is to be steered in such a manner that exclusively rolling friction occurs between all the wheels and the road surface, the end axis extensions, indicated by broken lines 2—9 in Figure 1, must intersect at a common steering centre L. If we examine the wheels $2a$, $3a$ (cf. Figure 2) allocated to the axles 2 and 3, we see that the wheel $2a$ must be locked through the angle $\alpha$, and the wheel $3a$ through the angle $\beta$, in order that the extensions of the wheel axes may intersect at the steering centre L. If the distance between the steering pins A, B is designated as $a$, and half the length of the vehicle as $b$, the formula is obtained:

$$b.\cot.\beta = a + b.\cot.\alpha$$

or $$\cot.\beta = \cot.\alpha + \frac{a}{b}$$

If this condition is fulfilled for all the wheels of the vehicle, the extended wheel axes always intersect at a common steering centre and exclusively rolling friction occurs between wheels and road surface. Projective geometry gives the foundation for the production of a drive which fulfils the abovementioned conditions (cf. Figure 3).

From a point P outside a circle $k$, two tangents Ta, Tb can be laid on the circle.

The chord which connects their two points of contact A, B is called the contact chord.

If in addition a straight line is laid through the point P and through the centre of the circle, this straight line intersects the circle at a diameter U, V.

This diameter is perpendicular to the contact chord A, B and intersects it at a point P'.

The diameter secant P, M is harmonically divided by the points of intersection U, V of the circle and by the corresponding points P, P'.

Conversely, at each inner dividing point P' and the intersection points U and V of the circle, there is a corresponding fourth harmonic point P which is determined as the point of intersection of the tangents of a contact chord erected at P' perpendicularly to the diameter secant.

Through the outer point P a straight line $p$ can be erected as an external perpendicular on the diameter secant, said perpendicular being parallel to the contact chord A–B (that is to say the line $p'$).

The following laws are obtained:

(1) The tangents at pairs of intersection points of the circle of all lines passing through P' all intersect on the outer perpendicular.

(2) The projected lines connecting adjacent points of intersection of the circle by any two chords through P' likewise intersect in all cases on the outer perpendicular. The points L, $L_1$ . . . $L_n$ of the outer perpendicular correspond to the series of chords A, B or $A_1$, $B_1$ . . . $A_n$, $B_n$ through P'.

The second law forms the foundation for the drive described hereinbelow, if the inner polar line $p'$ with the intersection points of the circle A, B is retained as singular radius.

The geometrical solution of the problem is obtained over the entire steering range of 360° by conceiving the middle vertical line to the axis of the vehicle, which is the geometrical locus of all centres of rotation, as a harmonic polar line of the circle running through the points A and B, while the points of intersection of the circle A, B constitute the steering axes of two wheels or wheel sets to be correspondingly steered.

If the rectangle A, B, D, C (Fig. 3), constitutes half a vehicle, the line C, D is at the same time the geometrical locus P of all the steering centre points at any wheel lock. With a corresponding wheel lock, the vehicle can turn around its own centre.

The steering axes, lying as mirror-images of the steering axes A, B, to the left of the outer polar lines $p$, and allocated to other wheels must be controlled conversely to the steering axes A, B (cf. axes E, F, Figure 2). A suitable solution of this problem will be explained hereinbelow.

If any desired chord of a circle is drawn through the point P', this chord will intersect the circle $k$ for example at the points $A_1$ and $B_1$. The extensions of the connecting lines $B_1$, B and A, $A_1$ intersect at the steering centre $L_1$ on the outer polar line $p$. If the lines $A_1$ and $B_1$ are, for example, allowed to travel around the inner pole P' in the counter-clockwise direction, the rotating chord intersects the circle $k$ at further points $A_2$, $A_3$, $A_4$ and $B_2$, $B_3$, $B_4$, and the extensions of the connecting lines between the axes A and B, on the one hand, and points $A_2$, $A_3$, $A_4$ and $B_2$, $B_3$, $B_4$ on the other hand then yield the further steering centres $L_2$, $L_3$, $L_4$, all of which likewise lie on the outer polar line $p$, and the connecting lines $A_1$, A and B, $B_1$ and A, $A_2$ respectively, and so on, or B, $B_2$ respectively, and so on, yield in each case the directions which the steering axes A, B must be given in order that the extended wheel axes may intersect at steering centres lying on the polar line $p$.

If, instead of the geometrical lines $A_1$, $B_1$, $A_2$, $B_2$, $A_3$, $B_3$ . . ., a material rod is conceived, which for example can be turned by means of the steering wheel $St$ in one direction of rotation or the other, the mechanism illustrated in Figures 4 and 5 can be developed therefrom.

In this mechanism the steering axes A, B can be turned about themselves, but are mounted fast on a housing plate which for example is disposed above the mechanism and is imaginary in the diagrammatic representation. The centres of the steering axes A and B are the points of intersection of the circle $k$ by the inner polar line $p'$ passing through the inner pole P'.

Concentrically about the inner pole P' is disposed a pole disc $p''$, which for example is mounted without an axle in the three rollers $c$, $d$, $e$ and can be turned in both directions by means of a steering wheel not shown in the drawing. This pole disc carries two slots $f$, $g$, which lie on a diameter passing through the centre P'. In these slots engage pins $A_1$ and $B_1$, which in turn are mounted fast in circular ring discs $M_A$ and $M_B$ respectively, the latter being able to turn concentrically to the centre M of the circle $k$ and each being mounted without an axle between three rollers $h$, $i$, $l$. The pin $B_1$ runs off from the circular ring $M_B$ in the upward direction, for example, and the pin $A_1$, for example, in the downward direction. On the pin $A_1$ is mounted a slide rod $Sa$, in such manner that it is able to turn about the pin $A_1$ with the aid of an eye embracing the pin $A_1$ after the style of a piston rod. The other end of this rod $Sa$ passes through the steering axis A. In the same way a rod $Sb$, which is not shown in the drawing but merely indicated by its middle axis in broken lines, passes through the steering axis B and through the pin $B_1$ indicated by a broken line.

The steering axes A, B correspond to the steering axes A, B in Figure 3, the pins $A_1$, $B_1$ correspond to the points of intersection of the chord of a circle turned about the inner pole P' within the circle, and the rods $Sa$, $Sb$ correspond to the connecting lines between A on the one hand and $A_1$, $A_2$, and so on, on the other hand, and B on the one hand and $B_1$, $B_2$ and so on, on the other hand.

In the position illustrated, the extensions of $Sa$ and $Sb$ intersect on the outer polar line $p$ at the steering centre $L_1$, which corresponds to the steering centre $L_1$ in Figure 3. If the pole disc $p''$ is turned in the counterclockwise direction, the pin $A_1$ travels to the left and thereby turns the steering axis A into another position, in such manner that the extension of $Sa$ intersects the outer polar line $p$ at a new steering centre situated between $L_1$ and P, and at the same time the steering axis B is turned in such a manner that the extension of $Sb$ intersects the outer polar line at the same steering centre.

Since between the centres of rotation of the rings $M_A$, $M_B$ and the pole disc $p''$ an eccentricity $MP'$ prevails, the useful length of the slots $f$, $g$ must be equal to twice the eccentricity. In order that the pole disc $p''$ can be turned by a full 360°, it is advisable to dispose the ring $M_A$, in order to guide the pin $A_1$, for example above, and the corresponding ring $M_B$ for the pin $B_1$ below the pole disc, to mount the three rings or discs on their outer periphery, and to bring the steering axes A, B to the mechanism from above and from below respectively.

The mechanism described above is suitable for the mathematically exact steering of two steering axes over the entire steering range of 360°. In practice steerability of 180° is of course sufficient, since an angle in the clockwise direction of more than 180° can be just as well replaced by a counterclockwise rotation by correspondingly less than 180°. With a steering range of 180° it is possible, for example, to travel backwards with a vehicle having its own drive and with forward speeds engaged, so that reverse drive may if desired be dispensed with.

In addition, with a rotation of 90° of the wheels it is possible without difficulty to drive the vehicle transversely to its longitudinal axis, so that then a vehicle can be parked by driving in the forward direction to a position level with the parking place, and then driving at right-angles thereto. It is thus possible to park vehicles in free places which are only just as large as the length of the vehicle.

The advantages of the steering mechanism are particularly apparent when the axle of the vehicle can be constructed as a solid or divided axle underslung in a manner known per se—in the form of pivoted axles or pivoted bogies, because then, in the manner known in ordinary horse-drawn carriages, the wheel axle can then also be rocked when the vehicle is at rest without bending moments occurring in the steering. The vehicle according to the present invention differs from the horse-drawn vehicle provided with pivoted bogies not only in respect of the device used to provide steering, but also in that in addition the vehicle can be turned about its own centre point by suitably rocking the axles.

The steering rods $Sa$, $Sb$ illustrated in Figure 4, which correspondingly steer the steering axes A and B, can be used direct, in accordance with the explanations of Figures 4 and 5, to turn the steering axles, if, for example, as illustrated, they pass through slots in said steering axles and thus steer the latter.

However, these steering rods $Sa$, $Sb$ may also be used to mark out grooves on control cams or the like, in such manner that on the rotation of these control cams the actual steering axles can be turned by a copying lever. The apparatus illustrated in Figures 4 and 5 then no longer serves as the actual control mechanism which is located on the vehicle, but as a machining device for the cams.

Such cams are illustrated in Figure 6. The diagrammatically indicated wheels 10 and 11 are mounted by means of guide forks (not shown) on the steering axles corresponding to the steering axes A and B, and the steering axles carry feeler levers 12, 13 non-rotatably connected thereto. The heads of these feeler levers, which may for example be equipped with rollers in order to reduce friction, run in grooves 14, 15 in two control rollers 16, 17. The grooves on these control cams are produced with the aid of a device corresponding to Figures 4 and 5. When the control cams 16, 17 are rotated by the control shaft through the medium of the sprocket wheels 19 and 20 and 21 and by means of the chain 22, the feeler levers 12 and 13 respectively, which are mounted on the steering axles A and B respectively, are rocked by amounts which correspond to the rotation of the control shaft 18, and hence to the rotation of the control cams 16, 17, and also to the shape of the grooves machined in the control cams. The shape of the grooves 14 and 15—apart from their fundamental mirror-image arrangement on the rotation of the control cams in the same direction—is slightly different from each other, namely to the extent to which the steering axles A and B are turned differently by the steering rods S$a$ and S$b$.

The apparatus illustrated in Figure 6 shows an embodiment in which the control cams have a basic body, which was produced by rotation inside the circular line about the control cam axis. With such control cams deflections of the steering axles A and B by a total of 180° can be achieved, which in practice is sufficient for steering over the whole of the possible steering range of 360°, since the steering of the axles by 180°+ an angle $n$ in the clockwise direction can be replaced by a steering of the axles by an angle of 180°— the angle $n$ in the counter-clockwise direction.

Instead of the steering cams, eccentric discs or discs having an eccentric guide groove can also be used, which render possible direct steering of the axles A and B to any desired angle up to 360°.

The steering rods S$a$, S$b$ illustrated in Figures 4 and 5 may furthermore be replaced by a reduction gear, as explained with reference to Figures 7 and 8.

The steering rod S$b$ has the task of steering the steering pin B in accordance with the rotation of the pole disc $p''$. The steering rod coincides with the tangent T$b$ at the moment at which the steering centre lies on the extension of the diameter secant MP, that is to say at which the steering centre coincides with the outer pole of the diameter secant. If the point B travels to the point B$_1$, the chord BB$_1$ is at the angle PBB$_1$ to the tangent T$b$. Since the radius MB is perpendicular to the tangent T$b$ (line BP) and the angle bisector MC of the angle BMB is perpendicular to the chord BB$_1$, the half centre angle BMC is equal to the angle PBB$_1$. From this it results that the steering rod, the position of which is determined by the points BB$_1$, turns about half the angle by which the radius MB has turned about the centre M in order to pass from B to B$_1$. The equivalent applies to the points AA$_1$. In consequence, the steering rods S$a$, S$b$ can be replaced by a gear with a corresponding reduction in the ratio of 1:2 between the steering axes A and B respectively, on the one hand, and the discs or rings M$_A$ and M$_B$, carrying the pins A$_1$ and B$_1$, respectively, on the other hand.

Such a gear is diagrammatically illustrated in Figure 8. In a housing 23 a pole disc 24 is mounted, for example, by means of three rollers 25 on its outer periphery, only one of the latter being shown for the sake of clarity. The pole disc carries for example in its bottom part a toothing 26, in which engages a toothed wheel 27, which is turned by the steering wheel 29 through the steering shaft 28. Beneath the pole disc is disposed a disc 30, which carries the pin B$_1$ which runs in a slot in the pole disc 24, as can also be seen in Figure 4. Above the pole disc is disposed another disc 31, which carries a pin A$_1$, which likewise engages in a slot in the pole disc 24, as can be seen in Figure 4. The centre axes of the discs 30 and 31 lie perpendicular to the plane of the figure, eccentrically by the distance K (which is shown in Figure 7) to the centre of the pole disc 24.

The axle 32 of the disc 30 passes through an aperture in the pole disc which is selected in accordance with the eccentricity K, and through the centre of the disc 31, and carries a gear wheel 33 which meshes with a gear wheel 34 having double the number of teeth and driving the steering axis B. In equivalent manner the disc 31 carries a sleeve 35, embracing the axle 32, and a gear wheel 36 which meshes with a gear wheel 37 having double the number of teeth and turning the steering axis A. If the pole disc is now turned by the steering wheel 29, the discs carrying the pins A$_1$ and B$_1$ respectively turn by determined angles, while the steering axes A and B are turned by half of these respective angles. The condition that the lines connecting B and B$_1$ and A and A$_1$ respectively must always intersect on the outer polar line P in Figure 7 is thereby fulfilled.

The steering axes A and B illustrated in Figure 8 do not now need to be the actual steering axles of the wheels themselves. For example, the whole steering gear may copy on a reduced scale the conditions actually existing in the vehicle (distance of the wheels from the two main centre axes of the vehicle), and the actual steering axles may be operated by a chain drive or the like, sprocket wheels 38, 39 being mounted on the steering axes A and B, for example, and driving by means of chains 40, 47 the actual steering axles of the wheels which are mounted on the vehicle.

As mentioned above, between the axis of the pole disc and the axes of the discs 30, 31 there is an eccentricity K perpendicular to the plane of the figure. As can be seen from Figure 4, which has been explained hereinabove, the longitudinal axes of the slots $f$, $g$ illustrated there—and in which the pins A$_1$ and B$_1$ respectively run also in the gear illustrated in Figure 8—pass through the centre point of the pole disc $p''$ (designated in Figure 8 by the reference numeral 24), that is to say they pass the centre of the discs 30 and 31, which in Figure 4 are designated by the references M$_A$, M$_B$, by the amount K of the eccentricity. If the pole disc is made slidable, the eccentricity between the pole disc 24 and the steering pin discs 30 and 31 can be eliminated at will, so that then the control slots for the pins A$_1$ and B$_1$ can be made to pass through the centre of the steering pin discs 30 and 31. If the pole disc is turned by the steering wheel 29, all wheels travel the same steering angle.

If, for example, as can be seen from Figure 9, all the wheels 42, 43, 44, 45 of the vehicle 46 are located in the position shown in solid lines, the vehicle will travel in the direction of the arrow 47. If the steering wheel is now turned, that is to say, without there being any eccentricity between the pole disc and the steering pin discs, all the wheels 42–45 will, for example, be adjusted in the direction of the arrow 48 or 49, that is to say, the vehicle can vary its previous direction of travel at any desired angle without needing to travel over a curve. For example it may immediately travel sideways at an angle of 90° to its own longitudinal axis. If the vehicle has its own drive, it may also travel backwards in the direction of the arrow 50 while engaging forward drive, when the wheels are turned by 180°.

In the above explanations only two steering axes A and B have so far been considered, for example the two front steering axles of a four-wheel vehicle. As can be seen from Figure 2, the angular deflections of those wheels which correspond to the wheels mounted on the steering axes A and F are of equal magnitude and oppositely directed. If the wheel mounted on the steering pin A is turned by an angular amount of $+\alpha$, the wheel mounted on the steering axis F must at the same time be turned by the angle $-\alpha$, but the wheel mounted on the steering axis E, on the other hand, by the amount $-\beta$. These steering movements of for example the rear wheels can easily be derived from the same steering gear: the steering axes corresponding to one another merely need to be coupled together with the interposition of a reversing gear. Known reversing gears, differential drives or limited belt or chain drives, may be used as such reversing gears.

Vehicles having more than four steering axles may also easily be made steerable in accordance with the above remarks, in such manner that the extension of all the wheel axles intersect at any desired steering angle at a common steering centre. In the case of vehicles having eight steering axles, for example, two steering gears may be used, each of which steers four axles in the above-described manner. These two steering gears may in turn be driven by a single steering wheel or by a single steering device of another type, appropriately in the same manner as explained with reference to Figure 6. To each of the steering gears the axles corresponding to one another are then allocated as indicated in Figure 10. By "corresponding steering axles" are to be understood those steering axles which have the same distances $\pm r$, or $\pm s$ from the outer polar line $p$, that is to say, those axles which have the same distances in one direction or the other from the line which is the geometrical locus of all common steering centres.

On each wheel axle passing through such a steering axle there may now in turn be mounted a plurality of wheels, for example two or four, so that vehicles having 16 or 32 wheels may without difficulty be steered while complying with the above described conditions.

The "corresponding steering axles" are, in the arrangement illustrated in Figure 10, the axles 51, 52, 53, 54, on the one hand, and the axles 55, 56, 57, 58 on the other hand. These "steering axles" 51 to 58 correspond to the steering axes shown in the previous figures and designated by the letters A and B, and are not to be confused with the actual wheel axles, which in turn normally lie perpendicularly to the axles 51 and 58.

In order to put to full use the above-described advantages of the steering gear, namely rotation of the steering axes by 360°, according to the invention, the wheel axles are constructed to be underslung, so that they can be rocked through any desired angle. Such a construction is illustrated diagrammatically in Figure 11. The individual steering axles 51 to 58 are held on arms 59. These arms are rockably secured to central supports 60, which in turn may be connected together by bars 61 and 62. The longitudinal connection of the two eight-wheel bogie sets is omitted for the sake of clarity. It can be effected by means of tubes, girders, or the like in one of the known manners. On the surface of the central supporting members 60 the body or other superstructure can be secured. The arms carrying the steering axles 51 to 58 can be suspended by rigid or elastic connections (not shown in Figure 11) on the central supporting members 60, as illustrated in Figure 12 in side view for one steered wheel set. This illustration shows a parallelogram linkage which may be sprung by means of helical springs or other spring members or by means of diaphragm housings filled with compressed air. Alternatively a cylinder (not shown) may be mounted on the central supporting member 60 which cylinder is filled with compressed air, pressure oil, or the like, and in which runs a piston supporting by means of a rod 65, which is secure against tension or pressure, the sleeve of the steering axle 52 and the arm 59. The piston and cylinder form a resilient abutment and in this way, each of the wheel axles 66, 67 is sprung independently. The supporting member 60, the sleeve 68 of the steering axle 52, and also the two connecting members 59 and 65 form a link parallelogram or a link trapezium, so that in the arrangement described it is in addition also possible to adjust the supporting member 60 vertically, by tightening or slackening the spring arrangement, in relation to the wheels, and thus to obtain greater ground clearance and also conversely, if desired, to lower the supporting members 60 on to the road surface, which is advantageous when loading or unloading on account of the low loading height. In order to permit a vertical position of the steering axle 52 also when the vertical position of the supporting members 60 is varied, a joint may also be inserted in the connection between the arm 59 and the guide sleeve 68 for the steering axle.

Figure 13 shows by way of example the cylinder connecting driving members in diagrammatic arrangement. A pole disc 70, indicated by a cylinder piece, for the steering gear of the four corresponding steering axles 51, 52, 53, 54 is turned by the steering wheel 29 with the aid of cable drive 69. Of the steering axles only cylinder sections are illustrated. Out of the pole disc 70 a length of shafting, which turns a cylinder 71, passes in the upward direction. This cylinder 71 corresponds to the sprocket wheel 38 in Figure 8.

The steering axle 52 is turned by this cylinder 71 by a cable drive 72. In order to obtain the inverse symmetrical rotation of the steering axle 53, a twisted cable drive 73 is guided from the cylinder 71 to an auxiliary cylinder 74, which drives the cylinder 74 by the same angular amounts but in the opposite direction to that in which the cylinder 71 is driven. The steering axle 53 is then steered by the cylinder 74 by means of a cable drive 75.

A cylinder 76, which corresponds to the sprocket wheel 39 in Figure 8, passes out of the pole disc 70 in the downward direction. In equivalent manner, as described for the cylinder 71 and the drive of the steering axles 52, 53, the cylinder 76 drives through a cable drive the steering axle 51, while a twisted cable drive 78 drives an auxiliary cylinder 79 which by means of a cable drive 80 steers the steering axle 54.

On the same axle as the pole disc 70 for the corresponding steering axles 51 to 54 is mounted a second pole disc 81 for the corresponding steering axles 55, 56, 57, 58, and the steering of these steering axles takes place through the pole disc 81 in the same way as the steering of the steering axles 51 to 54. In the case of the second steering gear 81 the steering connections to the steering axles are indicated merely by broken lines.

In order to avoid any return pulleys which might otherwise be necessary in the guiding of the cable drives, the cable drives can be replaced by Bowden cables of known type, advantageously in such manner that for the purpose of avoiding backlash between the driven shaft and the driving shaft two lengths of Bowden cable are inserted, of which on the initiation of a steering movement one is in each case shortened and the other lengthened. In order to permit rotations up to 360°, the Bowden cables can be guided once around the driven or driving shaft or pulley in each case.

The raisability and lowerability of the vehicle is inherent in the nature of the steering or can be provided in connection therewith, because when the steered wheels are turned by 90°, that is to say when the vehicle moves perpendicularly to its longitudinal axis, the ground clearance then becomes belly clearance and in consequence a variation of this magnitude is necessary or desirable in certain circumstances.

What I claim is:

1. A steering gear box for a vehicle having at least one pair of steerable wheels arranged symmetrically about the median longitudinal axis of the vehicle, which comprises a pair of steering spindles each adapted to steer a steering axle of one of the wheels over a steering range of up to 360°, a rotatable guide disc for each steering spindle, said discs being coaxially arranged, means for transmitting movement of the guide disc to its corresponding steering spindle, a pole disc arranged between said guide discs and adapted to be rotated by a steering wheel, and said guide discs respectively carrying a pin each engaging in a slot in the pole disc arranged on a diameter thereof.

2. A steering gear box as claimed in claim 1, wherein said pole disc and said guide discs are rotatably mounted at their peripheries by rollers.

References Cited in the file of this patent

UNITED STATES PATENTS

| 1,190,194 | Schleicher | July 4, 1916 |
|---|---|---|
| 1,285,289 | McGeorge | Nov. 19, 1918 |
| 2,247,985 | Borgward | July 1, 1941 |
| 2,358,236 | Lee | Sept. 12, 1944 |
| 2,423,266 | Stokes | July 1, 1947 |
| 2,470,496 | Krilanovich | May 17, 1949 |

FOREIGN PATENTS

| 136,391 | Great Britain | Dec. 18, 1919 |
|---|---|---|
| 451,813 | Great Britain | Aug. 12, 1936 |